United States Patent [19]
Lipschitz

[11] Patent Number: 5,203,579
[45] Date of Patent: Apr. 20, 1993

[54] SHOP E Z CART

[76] Inventor: Sarah Lipschitz, 2021 84 St., Apt. 5D, Brooklyn, N.Y. 11214

[21] Appl. No.: 770,363

[22] Filed: Oct. 3, 1991

[51] Int. Cl.$^5$ .............................................. B62B 3/00
[52] U.S. Cl. ................................. 280/33.991; 248/129; 280/DIG. 4
[58] Field of Search ...................... 280/33.991, 33.992, 280/33.995, 33.997, 35, DIG. 4, 659, 47.34–47.35, DIG. 3; 248/95, 97, 98, 128, 129; 224/273

[56] References Cited

U.S. PATENT DOCUMENTS

| | | | |
|---|---|---|---|
| 2,762,669 | 9/1956 | Watson | 280/33.991 |
| 4,097,056 | 6/1978 | Castellano | 280/47.35 |
| 4,560,096 | 12/1985 | Lucas et al. | 280/33.992 |
| 4,601,479 | 7/1986 | Reinbold et al. | 280/47.35 |
| 4,678,195 | 7/1987 | Trabiano | 280/33.992 |

FOREIGN PATENT DOCUMENTS 0070674 3/1991 Japan ............................ 280/33.992

Primary Examiner—Richard M. Camby
Attorney, Agent, or Firm—John P. Halvonik

[57] ABSTRACT

The invention is a clothes shopping cart that is designed to hold a substantial number of clothing and accessory items for a shopper in department and clothing stores. The cart moves about easily and provides the shopper with the ability to load up the cart with goods as a shopper wheels the cart about through the department store aisles. The clothing shopping cart is designed for ease of parking in conjunction with other carts. The cart uses a U shaped base and a storage space that is oriented to allow the carts to nest with each other. The cart is constructed to permit a substantial number or items to be placed in the cart prior to purchase while allowing for an adequate amount of room between the cart and aisles of the ordinary department store, so that a plurality of cars can move in and about the department store.

3 Claims, 3 Drawing Sheets

SHOP E Z CART

BACKGROUND OF THE INVENTION

1. Field of the Invention

The invention relates to the field of shopping carts and, in particular, to a cart with a U shaped support structure and V shaped base legs that allows other shopping carts to nest with it. The handle of the cart is T shaped to allow one to place clothing and other items upon the handle for storage.

2. Description of the Prior Art

While there are other shopping carts, none that applicant is aware of has the unique construction of her particular shopping cart.

SUMMARY OF THE INVENTION

The invention comprises a shopping cart of unique construction comprising a support structure of inverted U shape bent in two planes. The upper plane represents the support for the storage basket suspended from the curved portion of the U shape. The lower plane defines the orientation of the ends of the U which serve as base legs for the rollers, wheels, etc. The cart may be used within department stores so that clothing and accessory items may be placed on the cart and stored prior to purchase. The upright handle of the cart has a T shaped construction and may be used to hold clothing, etc picked up in the store.

An object of the invention is to provide a shopping cart that readily nests in conjunction with other carts.

Another objective is to provide a shopping cart that allows one to store a considerable amount of clothing with a minimum of space.

Yet another objective is to provide a shopping cart that can readily move about crowded aisles.

Other advantages of the invention should be readily apparent to those skilled in the art once the invention has been described.

DESCRIPTION OF THE DRAWINGS

FIG. 2C shows above view of the legs showing angled orientation

DESCRIPTION OF THE PREFERRED EMBODIMENT

Figure 1:
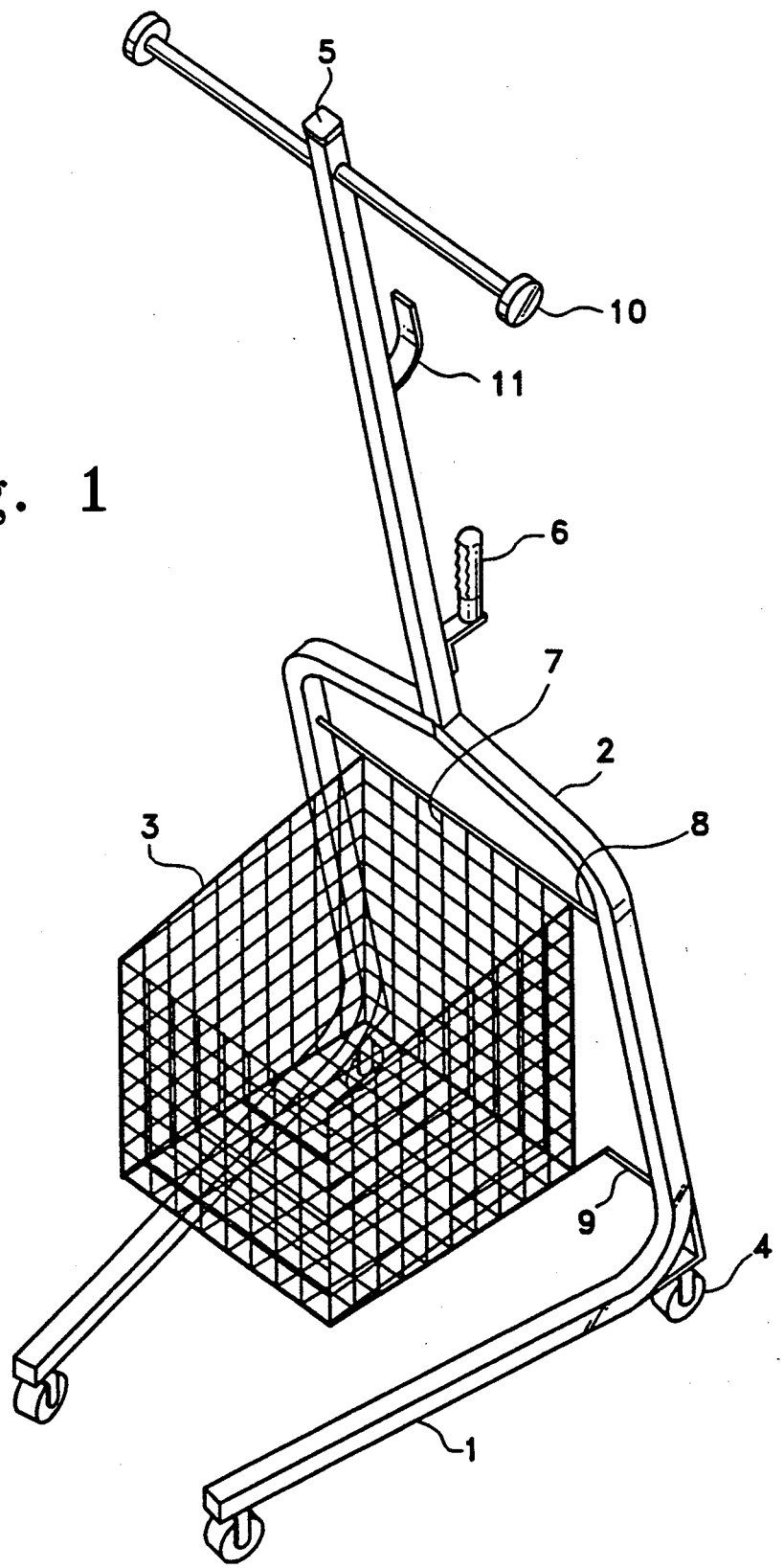
FIG. 1 shows overall construction of the Cart
Figure 2A:
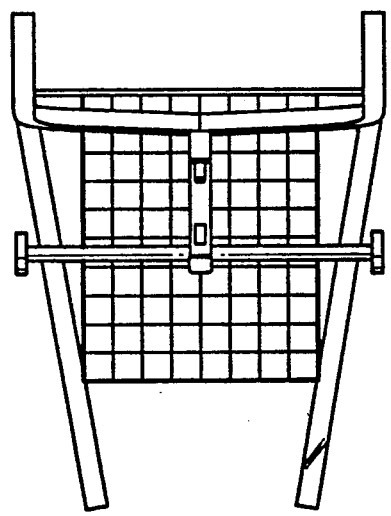
FIG. 2A shows front view of cart
Figure 2B:
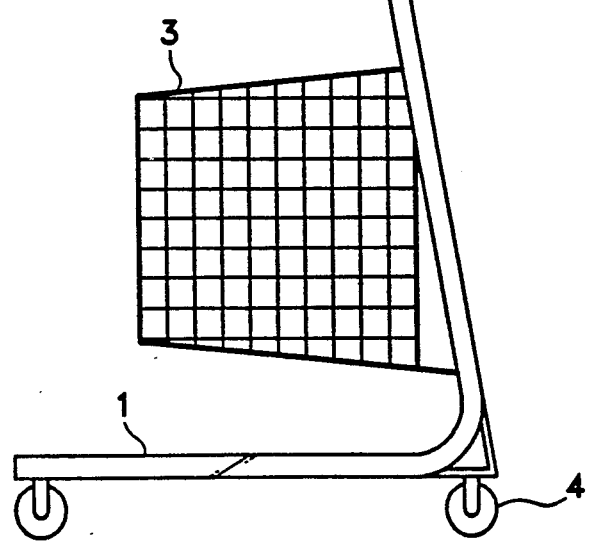
FIG. 2B shows side view of cart
Figure 3:
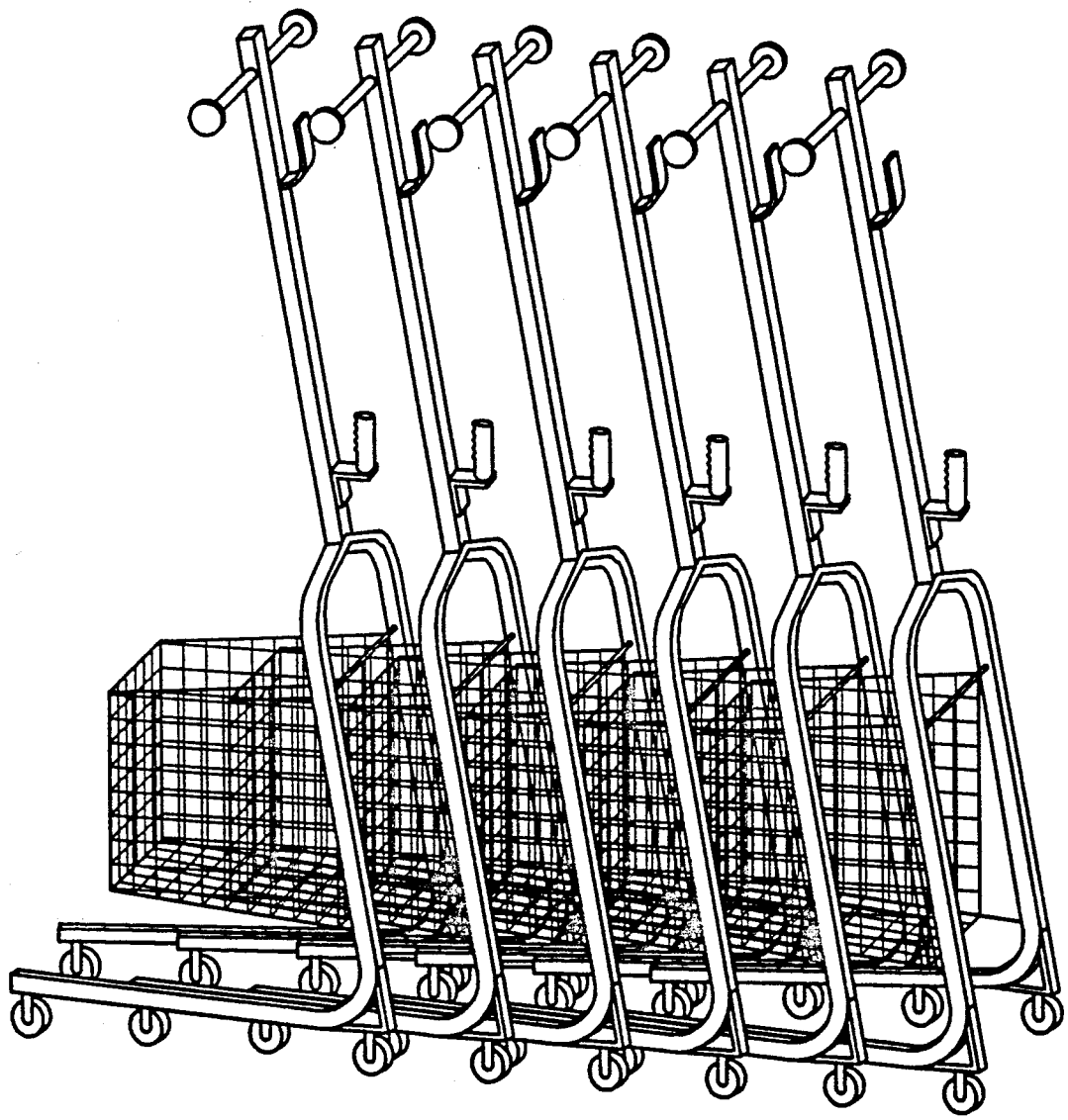
FIG. 3 shows the carts nested

The shop EZ Cart is substantially as shown in FIG. 1. The base is of a U shaped construction with the ends 1 of the U serving as a wheeled support base that lies in a plane parallel to the floor. The support legs should have four rollers 4 or other wheeled means on the two ends for ease of movement, preferably 2 rollers per leg. The curved central portion 2 of the U is bent upward (i.e.: the U is inverted when the cart is in ordinary position) in a plane that is perpendicular to the first plane.

The plane with the legs is about parallel to the floor upon which the cart will move and toward that end rollers, casters, etc. designated 4 are mounted on the bottom surface of the legs. Two of each caster are preferably on each end.

The construction of the base should preferably be of metal rods, tubes, etc. that are typically used in the shopping cart industry.

The actual storage container 3 is preferably a wire basket suspended from the curved portion of the U. As the curved portion lies above the floor, the middle of the U shape is actually the highest point of the base above the ground. The basket is suspended from the U shaped portion of the base, preferably near the highest standing parts of the base so that the basket rests above the plane of the floor.

The basket is preferably a wire basket of the kind that are commonly used in shopping carts. The basket is open at the top and the back wall 7 of the basket (that part of the basket that is closest to being directly below the curved part of the U) pivots upward so that other carts can nest with the subsequent baskets fitting inside the basket of the previous carts. The back wall of the basket forms a plane about perpendicular to the plane of the base and parallel to the plane of the upper part of the U. The basket is supported on the U shape by supports 8,9 in connection with the back wall. The upper part of the back wall should be pivotally connected to the upper support 8.

Goods are placed in the cart in the usually manner by depositing them into the open upper part, the back wall remains in place during use. The back wall pivots upward only when the carts are nested.

The storability of the cart is enhanced by the orientation of the container with the pivoting back wall. The baskets of the successive carts that are stacked adjacent will nest the basket portion of the next cart.

The bottom ends (legs) of the cart are slightly tapered inward so that they are converging. Thus the ends would form a V shape if they were extended all the way forward (which they are not). As it is, the angled ends enhance nesting because they allow successive, adjacent cart legs to fit within the space between the ends of the first cart.

The T shaped upper portion 5 should have rubberized ends 10 and these should be larger in diameter to prevent hangers from sliding off the upper handle. The upper portion is preferably of rounded construction and should allow hangers with clothing to hang from it. The rubber ends prevent hangers from falling off and will not snag clothing. Additional hooks 11 may be placed on the handle portion of the T to allow clothing, etc. to be stored.

A rubberized handle 6 may be placed in close connection with the upper part of the U to allow one to guide and push the vehicle.

I claim:

1. A shopping cart for the temporary storing of clothing comprising: base portion of substantially U shaped construction having two ends and a curved central portion connecting said ends, said U shape laying along two planes, said ends lying in a first plane and said curved portion lying in a second plane perpendicular to said first plane, said ends having roller means for movement, storage compartment in connection with said curved portion, said storage compartment having bottom wall, back and front walls and two side walls, said back wall located below said second portion of said U shape and about co-planar with said second plane, said back wall capable of pivoting upward so as to allow a plurality of said carts to nest alongside one another, said ends being slightly angled so as to facilitate nesting with other said carts, said cart having a handle portion in connection with said curved portion at about near the center of said curved portion, said handle having a T-shaped portion near said top end.

2. The apparatus of claim 1 wherein said handle means has a gripping portion.

3. The apparatus of claim 2 wherein each of said ends have two roller means for movement of said cart.

* * * * *